United States Patent
Kangyo (10) Patent No.: US 9,648,683 B2
(45) Date of Patent: May 9, 2017

(54) LIGHTING DEVICE, LIGHTING APPARATUS, AND LIGHTING FIXTURE

(71) Applicant: Panasonic Intellectual Property Management Co., Ltd., Osaka (JP)

(72) Inventor: Miyo Kangyo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/258,132

(22) Filed: Sep. 7, 2016

(65) Prior Publication Data

US 2017/0071038 A1    Mar. 9, 2017

(30) Foreign Application Priority Data

Sep. 8, 2015  (JP) ................................ 2015-177083

(51) Int. Cl.
*H05B 33/08* (2006.01)
(52) U.S. Cl.
CPC ..... *H05B 33/0815* (2013.01); *H05B 33/0827* (2013.01); *H05B 33/0845* (2013.01)
(58) Field of Classification Search
CPC  H05B 37/02; H05B 37/0272; H05B 33/0815; H05B 33/0803; H05B 33/0827; H05B 33/0839; H05B 33/086
USPC ... 315/247, 209 R, 224, 297, 307, 294, 360, 315/312
See application file for complete search history.

(56) References Cited

U.S. PATENT DOCUMENTS

| | | | | |
|---|---|---|---|---|
| 7,332,868 | B2* | 2/2008 | Okamoto | H05B 41/2925 315/209 R |
| 8,669,721 | B2* | 3/2014 | Watanabe | H05B 33/0818 315/224 |
| 8,686,663 | B2* | 4/2014 | Ishikita | H05B 33/086 315/294 |
| 9,474,127 | B2* | 10/2016 | Ido | H05B 37/02 |
| 2015/0035441 | A1* | 2/2015 | Hasegawa | H05B 33/0815 315/178 |

FOREIGN PATENT DOCUMENTS

| JP | 2014-232604 A | 12/2014 |
|---|---|---|
| JP | 2015-103505 A | 6/2015 |

* cited by examiner

*Primary Examiner* — Haissa Philogene
(74) *Attorney, Agent, or Firm* — Renner, Otto, Boisselle & Sklar, LLP (57) ABSTRACT

A lighting device includes a switching circuit configured to supply a supply voltage to each of a plurality of light sources by time division. The lighting device includes a variable control circuit configured to supply a continuous DC supply voltage to each of the light sources. The lighting device includes a controller. The controller includes a first control function of controlling the switching circuit. The controller includes a second control function of controlling the variable control circuit. The controller is configured to select either the first control function or the second control function for each of the light sources.

20 Claims, 4 Drawing Sheets

LIGHTING DEVICE, LIGHTING APPARATUS, AND LIGHTING FIXTURE

CROSS-REFERENCE TO RELATED APPLICATION

The present application is based upon and claims the benefit of priority of Japanese Patent Application No. 2015-177083, filed on Sep. 8, 2015, the entire contents of which are incorporated herein by reference.

TECHNICAL FIELD

The disclosure relates generally to lighting devices, lighting apparatuses, and lighting fixtures and particularly relates to a lighting device supplying electrical power to light sources, a lighting apparatus including light sources and the lighting device, and a lighting fixture including the lighting apparatus.

BACKGROUND ART

As a conventional example, a lighting device and lighting fixture are introduced in a Japanese Patent Application Publication JP 2015-103505 A [Document 1]. Alighting fixture described in Document 1 includes a plurality of light emitting diode (LED) groups (LED loads) different from each other in luminous colors. The lighting fixture includes a lighting device and emits mixed light as a result of the lighting device mixing light from the plurality of LED groups by turning on the plurality of LED groups in order, in time division. The lighting device includes a plurality of switching elements connected to the plurality of LED groups in series respectively. The lighting device is configured to adjust a quantity of light from each of the plurality of LED groups and adjust a chromaticity of mixed light by way of a controller controlling the plurality of switching elements.

The controller has a table in which dimming color signals inputted from an external apparatus are corresponding to sets of various control parameters. When the controller receives the dimming color signal indicating the luminous color and/or emission intensity (brightness), the controller provides repeatedly turning on light source switches in order, based on the received dimming color signal referring to the table. In this manner, each of the plurality of LED groups repeats operation of turning on the light source switches in order, and emits mixed light having color corresponding to the received dimming color signal.

Incidentally, in the lighting device and lighting fixture of Document 1, lengths of on-periods of the plurality of switching elements may be different from each other because the controller individually controls the plurality of switching elements by time division. For example, when the controller provides toning control (adjusts the chromaticity) so that the luminous color of the mixed light is similar to the luminous color of light from one LED group of the plurality of LED groups (which are different from each other in luminous color), the on-period of the switching element corresponding to the one LED group is longer than those of the switching elements corresponding to the other LED groups. Relatively, the on-periods of the switching elements corresponding to the other LED groups are shorter. In this case, flicker, such as video flicker may occur due to the other LED groups.

SUMMARY

In view of the above circumstances, an object of the present disclosure is to provide a lighting device, a lighting apparatus, and a lighting fixture which are capable of dimming and toning light, and reducing flicker such a video flicker.

A lighting device of an aspect in accordance with the present disclosure supplies electrical power to a plurality of light sources different from each other in luminous colors to emit light. The lighting device includes a power supply circuit configured to output a supply voltage. A switching circuit is configured to supply a first supply voltage to each of the light sources by time dividing the supply voltage. A variable control circuit is configured to supply a continuous DC second supply voltage, which is less than the supply voltage by a voltage drop, to each of the light sources. A controller includes a first control function of determining a supplying period for the first supply voltage based on a color signal and controlling the switching circuit in accordance with the supplying period to supply the first supply voltage. The controller includes a second control function of controlling the variable control circuit based on a dimming signal to adjust a value of the continuous DC second supply voltage. The controller is configured to select either the first control function or the second control function for each of the light sources.

A lighting apparatus of another aspect in accordance with the present disclosure includes the lighting device and the light sources.

A lighting fixture of another aspect in accordance with the present disclosure includes the lighting apparatus and the fixture body holding at least the light sources.

BRIEF DESCRIPTION OF THE DRAWINGS

The figures depict one or more implementation in accordance with the present teaching, by way of example only, not by way of limitation. In the figures, like reference numerals refer to the same or similar elements.

DETAILED DESCRIPTION

Hereinafter, a lighting device and a lighting apparatus according to an embodiment of the present disclosure are described in detail with reference to FIG. 1 to FIG. 3.

Figure 1:
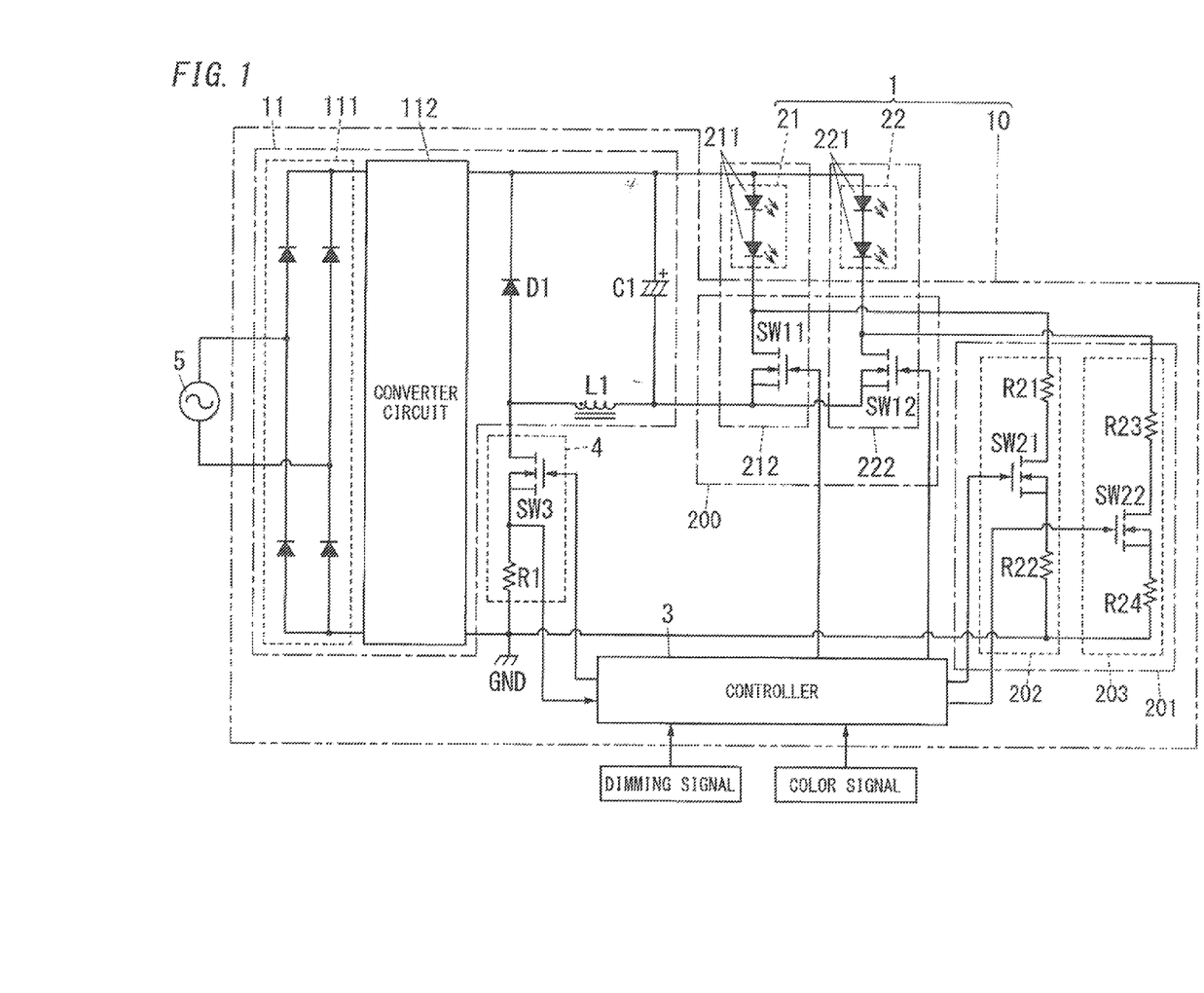
FIG. 1 is an exemplary circuit diagram of a lighting apparatus of an embodiment according to the present disclosure.

As shown in FIG. 1, the lighting device 10 of the present embodiment includes a power supply circuit 11, a switching circuit 200, a controller 3, a current adjuster 4, and a variable control circuit 201.

The lighting apparatus 1 of the present embodiment includes the lighting device 10 and a plurality of lighting sources 21, 22 different from each other in luminous colors (two in FIG. 1).

The power supply circuit 11 outputs a supply voltage. The supply voltage is a voltage between outputs of the power supply circuit. The power supply circuit 11 includes a rectifier 111, a converter circuit 112, a diode D1, a smoothing capacitor C1, and an inductor L1. The rectifier 111 rectifies an inputted voltage from a commercial power supply 5. The converter circuit 112 converts to a predetermined DC voltage from a pulsating voltage which is rectified by the rectifier 111.

The rectifier 111 includes a diode bridge and operates a full-wave rectification of the inputted voltage supplied from the commercial power supply 5. The converter circuit 112 smooths a full-wave rectified output voltage outputted from the rectifier 111 and converts a smoothed voltage to the predetermined DC voltage. An anode of the diode D1 is electrically connected to one end of the inductor L1. A cathode of the diode D1 is electrically connected to a positive electrode (higher potential side) of the converter circuit 112. The other side of the inductor L1 is electrically connected to a negative electrode of the smoothing capacitor C1. A positive electrode of the smoothing capacitor C1 is electrically connected to the positive electrode of the converter circuit 112. The smoothing capacitor C1 is connected in parallel to a series circuit configured with the diode D1 and the inductor L1. Note that, a negative electrode (lower potential side) of the converter circuit 112 is electrically connected to a ground (GND).

The light source 21 includes a plurality of LEDs (lighting Emitting Diodes) 211 (two in FIG. 1) which have a color temperature of, for example, about 6500 K. The light source 22 includes a plurality of LEDs 221 (two in FIG. 1) which have a color temperature of, for example, about 2700 K. Note that, the color temperatures of LEDs 211 and LEDs 221 are only examples so they are not limited to this embodiment. The plurality of LEDs 211 may be electrically connected in series to each other. Alternatively, the plurality of LEDs 211 may be electrically connected in parallel to each other. The plurality of LEDs 221 may be electrically connected in series to each other. Alternatively, the plurality of LEDs 221 may be electrically connected in parallel to each other.

The switching circuit 200 includes first switching elements SW11, SW12. Each of the first switching elements SW11, SW12 is an n-channel MOSFET (Metal-Oxide-Semiconductor Field-Effect Transistor). A drain of the first switching element SW11 is electrically connected to a cathode side of the light source 21. A source of the first switching element SW11 is electrically connected to the negative electrode of the smoothing capacitor C1. A drain of the first switching element SW12 is electrically connected to a cathode side of the light source 22. A source of the first switching element SW12 is electrically connected to the negative electrode of the smoothing capacitor C1. A series load circuit 212 with the light source 21 and the first switching element SW11 is electrically connected between both electrodes of the smoothing capacitor C1. A series load circuit 222 with the light source 22 and the first switching element SW12 is electrically connected between the both electrodes of the smoothing capacitor C1.

The current adjuster 4 includes a third switching element SW3 and a detective resistor R1. The third switching element SW3 is an n-channel MOSFET. A drain of the third switching element SW3 is electrically connected to a connection point between the anode of the diode D1 and the inductor L1. The drain of the third switching element SW3 is electrically connected in series to each of the first switching elements SW11, SW12 via the inductor L1. A source of the third switching element SW3 is electrically connected to the negative electrode of the power supply circuit 11 (the output of the converter circuit 112) via the detective resister R1.

The variable control circuit 201 includes a plurality of variable circuits 202, 203 electrically connected to the light sources 21, 22 in series respectively. Note that, the variable circuit 202 includes a second switching element SW21. The variable circuit 203 includes a second switching element SW22.

Each of the second switching elements SW21, SW22 is an n-channel MOSFET. A drain of the second switching element SW21 is electrically connected to a connection point between the light source 21 and the first switching element SW11 in the series load circuit 212 via a resister R21. A drain of the second switching element SW22 is electrically connected to a connection point between the light source 22 and the first switching element SW12 in the series load circuit 222 via a resister R23. A source of the second switching element SW21 is electrically connected to the negative electrode of the output of the converter circuit 112 via a resister R22. A source of the second switching element SW22 is electrically connected to the negative electrode of the output of the converter circuit 112 via a resister R24.

The controller 3 has a first control function and a second control function. The controller 3 controls the switching circuit 200 and variable control circuit 201 using the first control function and the second control function. The first control function is to determine a supplying period in which a first supply voltage is supplied to the light sources 21, 22 by time dividing the supply voltage, based on a color signal. For example, in the first control function, the controller 3 controls the switching circuit 200 so as to supply the first supply voltage to the light source 21 during the supplying period corresponding to the light source 21. In addition, for example, the controller 3 controls the switching circuit 200 so as to supply the first supply voltage to the light source 22 during the supplying period corresponding to the light source 22. The second control function is to control the variable control circuit 201 so as to adjust a continuous DC second supply voltage (second supply voltage) which is less than the supply voltage by a voltage drop and supplied to the light sources 21, 22 based on a dimming signal.

Additionally, the controller 3 controls on and off of the third switching element SW3 with PWM (Pulse Width Modulation) control based on the dimming signal.

In the first control function, the controller 3 provides the first control of controlling on and off of the first switching elements SW11, SW12, and controlling off of the second switching elements SW21, SW22, based on the color signal.

Furthermore, in the second control function, the controller 3 provides the second control of controlling off of the first switching elements SW11, SW12, and controlling the second switching elements SW21, SW22 in an active region.

The controller 3 includes a microcontroller having a memory. The microcontroller executes a program stored in the memory to carry out the control processes described herein. Note that, the controller 3 may include a plurality of integrated circuits each configured to individually perform a corresponding operation.

An output control of the controller 3 for controlling the third switching element SW3 is described. A gate of the third switching element SW3 is electrically connected to the controller 3. The controller 3 varies driving current flowing through the light sources 21, 22 corresponding to the first supply voltage by controlling on and off of the third switching element SW3, based on the dimming signal.

When the controller 3 controls the third switching element SW3 to be an in on-state, because the voltage between the output terminals of the converter circuit 112 is applied at a series circuit configured with the smoothing capacitor C1, the inductor L1, the third switching element SW3, and the detective resister R1, current flows through the series circuit. The controller 3 controls off of the third switching element SW3 when a voltage supplied to the detective register R1 reaches a detective threshold, in on-period of the third switching element SW3. Energy which is accumulated in the inductor L1 is discharged and current flows through a path of the inductor L1, the diode D1, the smoothing capacitor C1, and the inductor L1 in order when the third switching element SW3 is set in the off-state. Note that, the controller 3 controls the third switching element SW3 and varies driving current by varying the detective threshold which is compared with the voltage supplied to the detective register R1, based on the dimming signal.

The first control of the first control function is described with reference to FIG. 1. The controller 3 is electrically connected to a gate of each of the first switching elements SW11, SW12. The controller 3 individually controls on and off of the first switching element SW11, SW12 so that the first switching element SW11 and the first switching element SW12 are set in on-states by the time division. An individual current based on the color signal flows through the light source 21 and the light source 21 is turned on by the controller 3 controlling on and off of the first switching element SW11 and controlling the second switching element SW21 so as to be in an off-state. Additionally, an individual current based on the dimming signal flows through the light source 22 and the light source 22 is turned on by the controller 3 controlling on and off of the first switching element SW12 and the second switching element SW22 so as to be in an off-state.

The second control of the second control function is described. The controller 3 is electrically connected to a gate of each of the second switching elements SW21, SW22. The controller 3 provides a linear regulator control so that the second switching elements SW21, SW22 are linearly performed with the active region individually. More specifically, the controller 3 varies, within the active region of each of the second switching elements SW21, SW22, a gate voltage which the controller 3 outputs to the gate of each of the second switching elements SW21, SW22. Drain-source voltages of the second switching elements SW21, SW22 are varied because the gate voltages of the second switching elements SW21, SW22 are varied. In other words, the controller 3 controls a dropped voltage (voltage drop) of each of the second switching elements SW21, SW22. The controller 3 controls the first switching element SW11 so as to be in the off-state while operating the linear regulator control to the second switching element SW21. Additionally, the controller 3 controls the first switching element SW12 so as to be in the off-state while operating the linear regulator control to the second switching element SW22.

A second supply voltage is supplied to a light source which is connected to the second switching element controlled by the second control function. For example, the following voltage is applied to the light source 21 by the second switching element SW21 being controlled to turn on. The voltage (the second supply voltage) is obtained by subtracting a dropped voltage from the voltage between the output terminals of the converter circuit 112. The dropped voltage is applied to the variable circuit 202 which is electrically connected to the light source 21. Then, the light source 21 is turned on by the individual current corresponding to the second supply voltage flowing through the light source 21. The following voltage is applied to the light source 22 by the second switching element SW22 being controlled to turn on. The voltage is obtained by subtracting dropped voltage from the voltage between the output terminals of the converter circuit 112. A drop voltage is applied to the variable circuit 203 which is electrically connected to the light source 22. Then, the light source 22 is turned on by the individual current corresponding to the second supply voltage flowing through the light source 22.

Note that, the controller 3 may have a table in which the dimming signal previously corresponds to, the gate voltage supplied to the second switching element SW21, and the gate voltage supplied to the second switching element SW22. The table is preferably stored in the memory. The controller 3 may have two tables individually corresponding to the second switching element SW21 and the second switching element SW22. The controller 3 refers to the table and individually outputs the gate voltage to the second switching elements SW21, SW22 when receiving the dimming signal. Additionally, the controller 3 may output a predetermined gate voltage with a mathematical function previously stored in the memory when receiving the dimming signal.

Incidentally, the controller 3 assigns a plurality of current ratios in association with each of the light sources 21, 22 based on the color signal. Each of the plurality of current ratios is a ratio of a corresponding individual current individually flowing through the light sources 21, 22 over a sum of the current (a total current) flowing through both the light sources 21, 22.

TABLE 1

| Current Ratio of Light Source 21 | Current Ratio of Light Source 22 | Output Ratio | Switching Frequency | Control to Second Light Source 22 |
|---|---|---|---|---|
| 1/2 | 1/2 | 1:1 | 25 kHz | First Control |
| 2/3 | 1/3 | 2:1 | 17 kHz | First Control |
| 4/5 | 1/5 | 4:1 | 10 kHz | First Control |
| 9/10 | 1/10 | 9:1 | 5 kHz | First Control |
| 99/100 | 1/100 | 99:1 | 500 Hz | First Control |
| 999/1000 | 1/1000 | 999:1 | 50 Hz | Second Control |

An output ratio in Table 1 is a relative ratio with the current ratio of the light source 21 and the current ratio of the light source 22. For example, when the current ratio of the light source 21 is ½ and the current ratio of the light source 22 is ½, the output ratio is 1:1.

As shown in Table 1, the controller 3 provides the first control to the light source 21 and light source 22 when the output ratio is 1:1. The controller 3 specifies the supplying periods (on-periods of the first switching elements SW11, SW12) in which current flow through the light sources 21, 22 based on the current ratios of the light sources 21, 22 respectively. The controller 3 controls the first switching element SW11 and the first switching element SW12 so as to turn on of the first switching element SW11 and the first switching element SW12 which are correspond to the output ratio based on the color signal. Then, the controller 3 controls on and off of each of the first switching elements SW11, SW12 so that both on-states of the switching elements SW11, SW12 are not overlapped with each other (refer to FIG. 2A and FIG. 2B). Note that, the light source controlled by the first control is defined as a first light source.

For example, the on-period of the first switching element SW12 is a unit time when a value of the individual current flowing through the light source 22 is smaller than a value of the individual current flowing through the light source 21. The length of the unit time equals to a length of a switching period of the third switching element SW3 (refer to FIG. 2A and FIG. 2B). The on-period of the first switching element SW11 is set to an integral multiple of the unit time in accordance with the output ratio with the current ratio of the light source 21 and the current ratio of the light source 22.

Here, the case of that the current ratio of the light source 21 is ½ and the current ratio of the light source 22 is ½ (output ratio is 1:1) is described with reference to FIG. 2A. The controller 3 individually provides the first control of the first control function to the light source 21 and light source 22. The light source 21 is the first light source. In addition, the light source 22 is the first light source. Note that, a length of a period T0 equals to the length of the switching period (one cycle) of the third switching element SW3. A length of a period T1 equals to the length of the switching period (one cycle) of the first switching elements SW11, SW12. Additionally, the switching frequency of the third switching element SW3 is 1/T0. The switching frequencies of the first switching elements SW11, SW12 are 1/T1. In this case, the length of the on-period of the first switching element SW11 equals to the length of the on-period of the first switching element SW12. Furthermore, the switching frequency of the third switching element SW3 is 50 kHz.

Figure 2A:
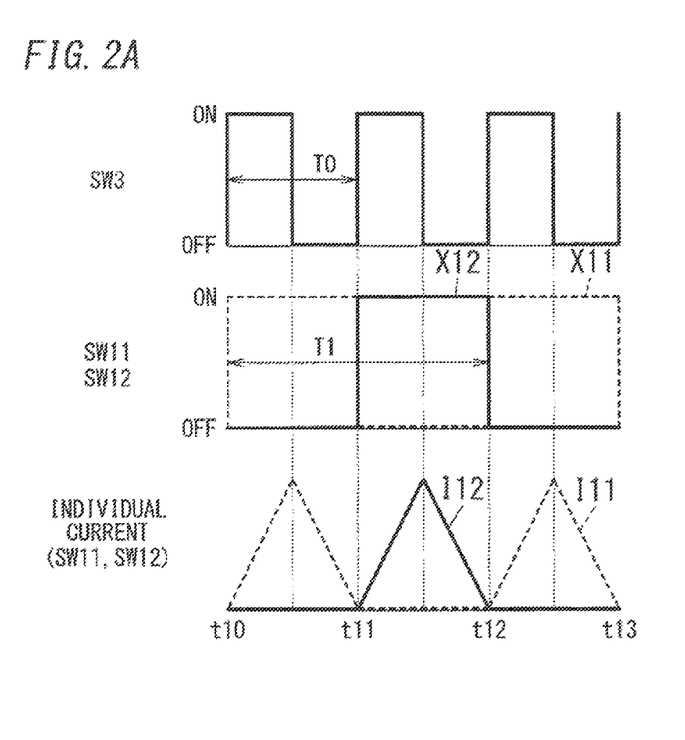
FIG. 2A is a timing chart of an operation of a first control of a lighting device of the embodiment according to the present disclosure.
Figure 2B:
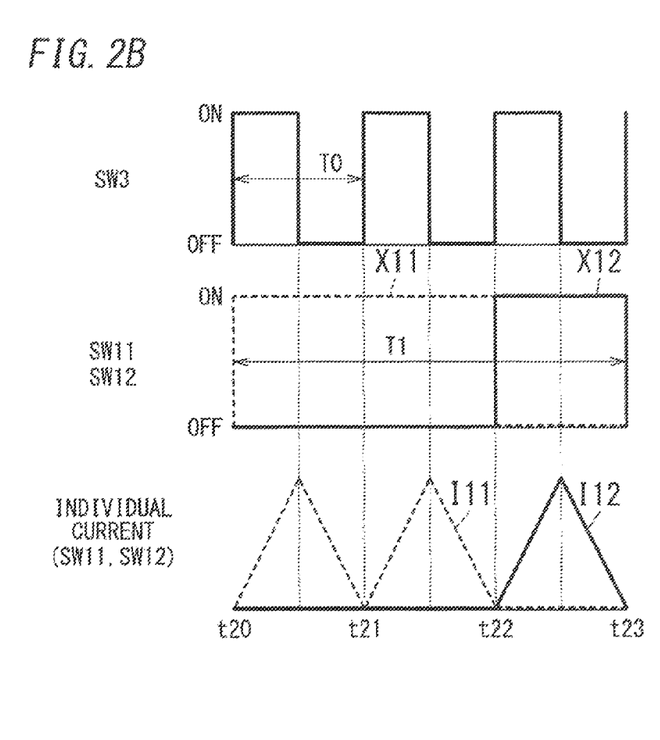
FIG. 2B is a timing chart of another example of the operation of the first control of the lighting device.

In FIG. 2A and FIG. 2B, states X11, X12 indicate states of the first switching elements SW11, SW12, respectively. In addition, individual currents I11, I12 indicate individual current flowing through the first switching elements SW11, SW12, respectively.

First of all, as shown in FIG. 2A, the controller 3 controls the first switching element SW11 so as to be in the on-state, synchronizing to the switching frequency of the third switching element SW3, during a first period t10 to t11. At this time, the first switching element SW12 is controlled so as to be in the off-state by the controller 3. Next, the controller 3 controls the first switching element SW11 so as to be in the off-state during the second period t11 to t12. The first switching element SW12 is controlled so as to be in the on-state by the controller 3. Then, the controller 3 controls the first switching element SW11 so as to be in the on-state during the third period t12 to t13, like the first period t10 to t11. The controller 3 controls the first switching element SW12 so as to be in the off-state.

In this manner, the controller 3 controls the first switching element SW11 and the first switching element SW12 so that the first switching element SW11 and the first switching element SW12 are alternately set in the on-state at every switching period of the third switching element SW3. In other words, the on-state of the first switching element SW11 and the on-state of the first switching element SW12 are not overlapped with each other. As a result, as shown in FIG. 2A, each of the first switching elements SW11, SW12 repeat turning on and off with 25 kHz switching frequency (refer to Table 1). Hence, the light sources 21, 22 emit mixed light having color temperature of about 4600 K corresponding to the color signal by the light source 21 and the light source 22 alternately repeating turning on.

Next, as shown in FIG. 2B, the case where the current ratio of the light source 21 is ⅔ and the current ratio of the light source 22 is ⅓ (output ratio is 2:1) is described. The controller 3 individually provides the first control of the first control function to the light source 21 and the light source 22. Accordingly, the light source 21 and the light source 22 are the first light sources. Note that, the light source 22 which has a minimum value of an individual current of the light sources 21, 22 is a third light source. Additionally, the light source 21 which is different from the third light source of the light sources 21, 22 is a fourth light source. The controller 3 controls the first switching element SW11 so as to be in the on-state, synchronizing to the switching frequency of the third switching element SW3, during a first period t20 to t21. At this time, the first switching element SW12 is controlled so as to be in the off-state by the controller 3. Next, the controller 3 controls the first switching element SW11 so as to be in the on-state continuously during the second period t21 to t22. The first switching element SW12 is controlled so as to be in the off-state continuously by the controller 3. Then, the controller 3 controls the first switching element SW11 so as to be in the off-state during the third period t22 to t23. At this time, the first switching element SW12 is controlled so as to be in the on-state by the controller 3.

In this manner, the controller 3 controls the first switching element SW11 so as to be in the on-state in two cycles of the switching period of the third switching element SW3. Then the controller 3 controls the first switching element SW12 so as to be in the on-state in one cycle of the switching period of the third switching element SW3. As a result, as shown in FIG. 2B, each of the first switching elements SW11, SW12 repeats turning on and off with a switching frequency of 17 kHz (refer to Table 1). Hence, the light sources 21, 22 emit mixed light having a color temperature of about 5200 K corresponding to the color signal by the light source 21 and the light source 22 alternately repeating to be turned on.

The controller 3 may control the light sources 21, 22 so that the light sources 21, 22 emit light with a color which is close to a monochromatic color of either the light source 21 or the light source 22, based on the color signal. In other words, the controller 3 may control the light sources 21, 22 so that current flowing through one light source (such as light source 21) is sufficiently larger than the current flowing through the other light source (such as light source 22). Example of the above-mentioned case includes a case of the output ratio being large, for example, the current ratio of the light source 21 is 999/1000 and the current ratio of the light source 22 is 1/1000 (output ratio is 999:1). For example, the controller 3 is assumed to control both the first switching element SW11 and the first switching element SW12 with the first control when the output ratio is 999:1. As shown in Table 1, each of the first switching elements SW11, SW12 repeats turning on and off with the switching frequency of 50 Hz when the switching frequency of the third switching element SW3 is 50 kHz. In other words, the period of turning off of the light source 22 (off-period of the first switching element SW12) is much longer in comparison with the case of the output ratio being 1:1 when the current ratio of the light source 22 is 1/1000. As a result, flicker, such as video flicker, may occur.

Therein, the controller 3 is set a current ratio threshold TH, and, for example, the current ratio threshold TH is 1/100. When either the current ratio of the light source 21 or the current ratio of the light source 22 is equal to or less than the current ratio threshold TH, the controller 3 provides the second control, which is the linear regulator control, to the second switching element SW21 or the second switching element SW22 corresponding to the light source which has the current ratio being equal to or less than the current ratio threshold TH. Note that, the light source controlled by the second control is defined as a second light source.

In the second control of the second control function, the light source which has the current ratio being larger than the current ratio threshold TH of the light sources 21, 22 is defined as the first light source. The light source which has the current ratio being equal to or less than the current ratio threshold TH of the light sources 21, 22 is defined as the second light source. Hereinafter, the first light source is defined as the light source 21 and the second light source is defined as the light source 22.

Figure 3A:
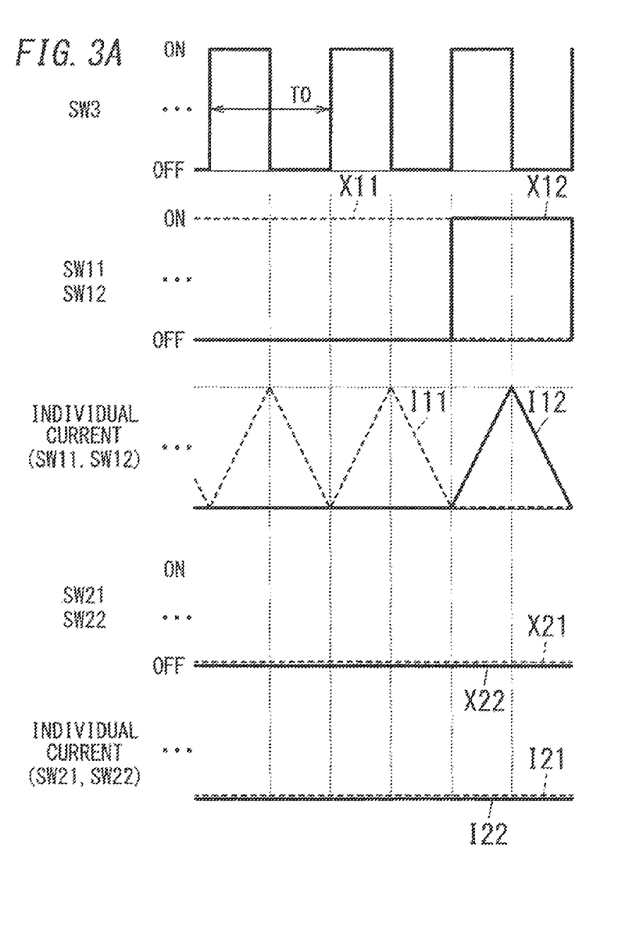
FIG. 3A is a timing chart of the operation of the first control of the lighting device.
Figure 3B:
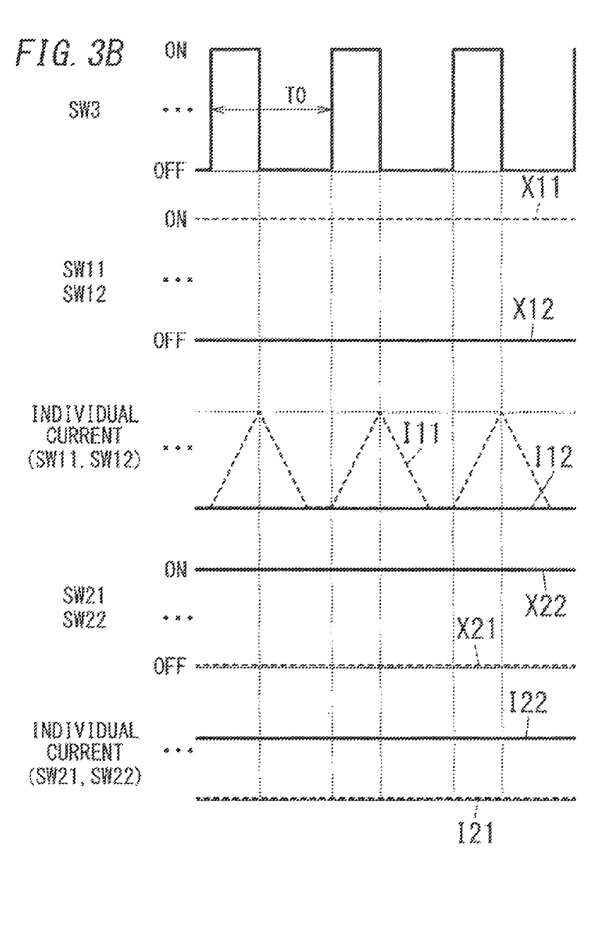
FIG. 3B is a timing chart of an operation of a second control of the lighting device of above.

Note that, as shown in FIG. 3A and FIG. 3B, a state X11 indicates a state of the first switching element SW11. A state X12 indicates a state of the first switching element SW12. A state X21 indicates a state of the second switching element SW21. A state X22 indicates a state of the second switching element SW22. Additionally, an individual current I11 indicates an individual current flowing through the first switching element SW11. An individual current I12 indicates an individual current flowing through the first switching element SW12. An individual current I21 indicates an individual current flowing through the second switching element SW21. An individual current I22 indicates an individual current flowing through the second switching element SW22.

As shown in FIG. 3B, the controller 3 controls the first switching element SW12 so as to be in the off-state (state X12 is the off-state), varies the gate voltage of the second switching element SW22 (second control) when the output ratio is 100:1. The individual current I22 limited by the second switching element SW22 flows through the light source 22. The light source 22 emits light while the second switching element SW22 performs within the active region. The controller 3 controls the first switching element SW11 so as to be in the on-state (state X11 is the on-state), and off of the second switching element SW21 (state X21 is the off-state). The light source 21 emits light while the first switching element SW11 is set in the on-state. The case where the first switching element SW12 is off all the time while the second switching element SW22 performs within the active region, is included in the example of a case where the on-period of the first switching element SW11 and the on-period of the first switching element SW12 are not overlapped with each other is included.

In contrast, as shown in FIG. 3A, the controller 3 provides the first control to the both the first switching element SW11 and the first switching element SW12 when the output ratio is 99:1. In this case, the controller 3 provides PWM control so that the switching frequency of the third switching element SW3 is 50 kHz and a duty cycle of 50%. Note that, FIG. 3A shows timing of a switching of the first switching element SW11 being from on to off.

Herein, when the output ratio is 100:1 and the switching frequency of the third switching element SW3 is 50 kHz with a duty cycle of 50%, the total current flowing through the light source 21 and light source 22 is increased by a value of the current which flows through the light source 22, in comparison with the expected value of current based on the dimming signal. In accordance with, the controller 3 sets the on-period of the third switching element SW3 to be shorter by lowering the detective threshold. As shown in FIG. 3A and FIG. 3B, the controller 3 reduces, from the individual current I22 flowing through the second switching element SW22 (light source 22), the individual current I11 flowing through the first switching element SW11 (light source 21). Then, the controller 3 controls the third switching element SW3 so as to turn on at to a dimming level based on the dimming signal.

The lighting device 10 and the lighting apparatus 1 of the present embodiment is configured as described above and thus are capable of dimming and toning light, and reduce flicker, such as video flicker by providing the second control even when the current ratio of each of the light sources 21, 22 is sufficiently small.

Note that, in the first control, when the output ratio is 2:1, the controller 3 may control the first switching element SW11 to be in the on-state for 20 cycles of the switching period of the third switching element SW3 continuously, for example. Thereafter, the controller 3 may control the first switching element SW12 to be in the on-state for 10 cycles of the switching period of the third switching element SW3 continuously, for example.

The switching frequency of the third switching element SW3 is not limited to 50 kHz. The lighting apparatus 1 of the present embodiment may include three or more light sources. In addition, each of the plurality of light sources may be configured with a single LED.

The lighting device 10 of the present embodiment for supplying electrical power to a plurality of light sources 21, 22 different from each other in luminous colors to emit light. The lighting device 10 includes the power supply circuit 11 configured to output the supply voltage. The lighting device 10 further includes the switching circuit 200 configured to supply the first supply voltage to each of the light sources 21, 22 by time dividing the supply voltage. The lighting device 10 further includes the variable control circuit 201 configured to supply the continuous DC second supply voltage, which is less than the supply voltage by the voltage drop, to each of the light sources 21, 22. The lighting device 10 further includes the controller 3. The controller 3 includes the first control function of determining a supplying period for the first supply voltage based on the color signal and controlling the switching circuit 200 in accordance with the supplying period to supply the first supply voltage. The controller 3 further includes the second control function of controlling the variable control circuit 201 based on the dimming signal to adjust a value of the continuous DC second supply voltage. The controller 3 is configured to select either the first control function or the second control function for each of the light sources 21, 22.

The lighting device 10 of the present embodiment is configured as described above is and thus capable of dimming and toning light, and reduce flicker, such as video flicker.

In the lighting device 10 of the present embodiment, the variable control circuit 201 preferably includes a plurality of variable circuits 202, 203 respectively corresponding to the light sources 21, 22. Each of the variable circuits 202, 203 is preferably to be electrically connected in series to a corresponding light source of the light sources 21, 22. The controller 3 is preferably configured to adjust the value of the continuous DC second supply voltage supplied to each of the light sources 21, 22 by adjusting the voltage drop of each of the variable circuits 202, 203.

Preferably, the lighting device 10 of the present embodiment further includes the current adjuster 4 configured to adjust a value of the driving current flowing through the light sources 21, 22. The switching circuit 200 preferably includes a plurality of first switching elements SW11, SW12 respectively corresponding to the light sources 21, 22 and to be electrically connected to the light sources 21, 22 in series. The current adjuster 4 is preferably electrically connected in series to each of the first switching elements SW11, SW12. The variable control circuit 201 preferably includes a plurality of second switching elements SW21, SW22 that respectively correspond to the plurality of series load circuits 212, 222. Each of the second switching elements SW21, SW22 preferably has a first end and a second end.

The first end is preferably electrically connected to a connection point between a corresponding light source (21 or 22) of the light sources 21, 22 and a corresponding first switching element (SW11 or SW12) of the first switching elements SW11, SW12. The second end is preferably electrically connected to the negative electrode of the power supply circuit 11. The controller 3 is preferably configured to control the current adjuster 4, the first switching elements SW11, SW12, and the second switching elements SW21, SW22. The controller 3 is preferably configured to control the current adjuster 4 based on the dimming signal. The controller 3 is preferably configured to specify the plurality of current ratios in association with the light sources 21, 22 by using a plurality of individual currents I11, I12 respectively flowing through the light sources 21, 22 and the total current which is a sum of the individual currents I11, I12. Preferably, each of the current ratios is the ratio of the corresponding individual current (I11 or I12) over the total current based on the color signal. One or more first light sources of the light sources 21, 22 are preferably have the current ratio bigger than the predetermined threshold (current ratio threshold) TH. One or more second light sources are preferably of the light sources (21, 22) have the current ratio equal to or smaller than the predetermined threshold (current ratio threshold) TH. The controller 3 is preferably configured to individually control switching on and off of one or more first switching elements, connected in series to the first light source(s), in accordance with one or more current ratios specified in association with the first light source(s) so that the on-period of each of the first switching element(s) does not overrun. The controller 3 is preferably configured to control one or more second switching elements, connected in series to the first light source(s), so as to be in the off-states. The controller 3 is preferably configured to control one or more first switching elements, connected in series to the second light source(s), so as to be in the off-states. The controller 3 is preferably configured to provide linear regulator control of one or more second switching elements, connected in series to the second light source(s), by operating in an active region in accordance with the current ratio(s) specified in association with the second light source(s).

Because the lighting device 10 of the present embodiment is configured as described above, the lighting device 10 is capable of dimming light based on the dimming signal by the controller 3 providing PWM control to the third switching element SW3. In addition, the controller 3 switches the first control, in which the controller 3 controls controlling on and off of the first switching elements SW11, SW12, and the second control, in which the controller 3 provides the linear regulator control to the second switching elements SW21, SW22. The lighting device 10 can mix color while reducing flicker, such as video flicker, based on the color signal by the controller 3 switching the first control and the second control. Hence, the lighting device 10 is capable of dimming and toning light, and reduces flicker, such as video flicker.

In the lighting device 10 of the present embodiment, the first light source(s) 21, 22 preferably includes the third light source having the minimum value of an individual current, and the fourth light source having a different individual current from the third light source. An on-period of the third light source is preferably a unit time. An on-period of the fourth light source is preferably set as an integral multiple of the unit time in accordance with an output ratio of a current ratio of the third light source and a current ratio of the fourth light source.

The lighting device 10 of the present embodiment is configured as described above, and thus the controller 3 can easily control the light sources 21, 22 based on the color signal.

In the lighting device 10 of the present embodiment, the current adjuster 4 preferably includes the third switching element SW3. The controller 3 controls on and off of the third switching element SW3.

the lighting device 10 of the present embodiment is configured as described above, and thus the controller 3 can easily control the light sources 21, 22 based on the dimming signal.

The lighting apparatus 1 of the present embodiment includes the lighting device 10 and the light sources 21, 22 different from each other in luminous colors.

The lighting apparatus 1 of the present embodiment is preferably configured as described above and thus is capable of dimming and toning light, and reduces flicker, such as video flicker.

The lighting fixtures 7, 8 of the present embodiment are described with reference to FIG. 4A, and FIG. 4B. Note that, hereinafter, top and bottom are defined in FIG. 4A and FIG. 4B unless otherwise specified.

Figure 4A:
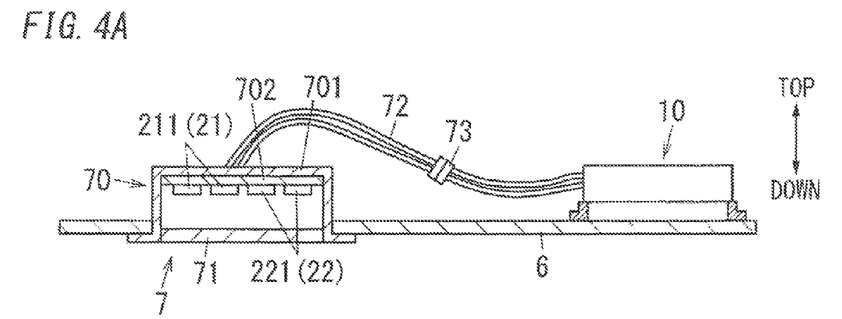
FIG. 4A is a schematic configuration diagram of a separated-type of a lighting fixture of the embodiment according to the present disclosure.

The lighting fixture 7 shown in the FIG. 4A is a down light embedded and arranged in a ceiling finishing material 6. The lighting fixture 7 includes a fixture body 70 which accommodates the light source 21 configured with LEDs 211 and the light source 22 configured with LEDs 221, and the lighting apparatus 1 which installed in a back side (top side) of the ceiling finishing material 6 (refer to FIG. 1).

The fixture body 70 is made by a metal prepared by the method, such as aluminum die casting and has a cylindrical shape with a bottom 701. The fixture body 70 has an opening at the down end of the fixture body 70. The fixture body 70 installs the light sources 21, 22 at an inner bottom surface 702 of the bottom 701, in the inside of the fixture body 70. The opening of the down end of the fixture body 70 is closed by a cover 71 having a disk shape. Note that, the cover 71 is made by a transmissive material, such as glass and polycarbonate.

The lighting device 10 is accommodated in a case made by a metal and having a rectangular box shape. In addition, the lighting device 10 is electrically connected to the light sources 21, 22 installed in the fixture body 70 via power supply cables 72 and a connector 73.

Figure 4B:
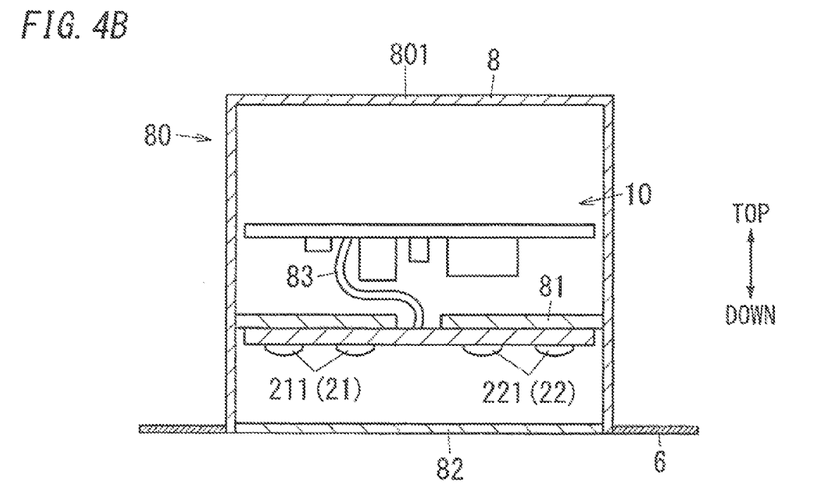
FIG. 4B is a schematic configuration diagram of an integrated-type of the lighting fixture of the embodiment according to the present disclosure.

On the other hand, the lighting fixture 8 shown in FIG. 4B a down light embedded and arranged in the ceiling finishing material 6. The lighting fixture 8 includes a fixture body 80 accommodating the light source 21 configured with LEDs 211, the light source 22 configured with LEDs 221, and the lighting device 10.

The fixture body 80 is made by a metal prepared by the method, such as an aluminum die casting and has a cylindrical shape with a bottom 801. The fixture body 80 has an opening at the down end of the fixture body 80. The internal space of the fixture body 80 is divided to top and down by a partition board 81 having a disk shape. The opening of the down end of the fixture body 80 is closed by a cover 82 having a disk shape. The cover 82 is made by a transmissive material, such as glass and polycarbonate.

The light sources 21, 22 are installed below the partition board 81. In addition, the lighting device 10 is accommodated in an upper space, which is above the partition board 81 of the internal space, and is electrically connected to the light sources 21, 22. The lighting device 10 is electrically connected to the light sources 21, 22 via a power supply cable 83.

The lighting fixture 7, 8 of the present embodiment includes the lighting apparatus 1 and the fixture body 70, 80 holding at least the light sources 21, 22.

The lighting fixture(s) 7, 8 of the present embodiment is configured as described above is capable of dimming and toning light, and reduces flicker, such as video flicker.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device for supplying electrical power to a plurality of light sources different from each other in luminous colors to emit light, the lighting device comprising:
    a power supply circuit configured to output a supply voltage;
    a switching circuit configured to supply a first supply voltage to each of the light sources by time dividing the supply voltage;
    a variable control circuit configured to supply a continuous DC second supply voltage, which is less than the supply voltage by a voltage drop, to each of the light sources; and
    a controller including:
        a first control function of determining a supplying period for the first supply voltage based on a color signal and controlling the switching circuit in accordance with the supplying period to supply the first supply voltage; and
        a second control function of controlling the variable control circuit based on a dimming signal to adjust a value of the continuous DC second supply voltage, and
    the controller being configured to select either the first control function or the second control function for each of the light sources.

2. The lighting device according to claim 1, wherein:
    the variable control circuit includes a plurality of variable circuits respectively corresponding to the light sources;
    each of the variable circuits is to be electrically connected in series to a corresponding light source of the light sources; and
    the controller is configured to adjust the value of the continuous DC second supply voltage supplied to each of the light sources by adjusting the voltage drop of each of the variable circuits.

3. The lighting device according to claim 1, further comprising
    a current adjuster configured to adjust a value of a driving current flowing through the light sources, wherein:
    the switching circuit includes a plurality of first switching elements respectively corresponding to the light sources and to be electrically connected to the light sources in series;
    the current adjuster is electrically connected in series to each of the first switching elements;
    the variable control circuit includes a plurality of second switching elements that respectively correspond to a plurality of series load circuits,
    each of the second switching elements has a first end and a second end,
        the first end is electrically connected to a connection point between a corresponding light source of the light sources and a corresponding first switching element of the first switching elements, and
        the second end is electrically connected to a negative electrode of the power supply circuit;
    the controller is configured to control the current adjuster, the first switching elements, and the second switching elements;
        the controller is configured to control the current adjuster based on the dimming signal,
    the controller being configured to specify a plurality of current ratios in association with the light sources by using a plurality of individual currents respectively flowing through the light sources and a total current which is a sum of the individual currents,
    each of the current ratios being a ratio of a corresponding individual current over the total current based on the color signal;
    one or more first light sources of the light sources have a current ratio bigger than a predetermined threshold, and one or more second light sources of the light sources have a current ratio equal to or smaller than the predetermined threshold; and
    the controller is configured to
        individually control switching on and off of one or more first switching elements, connected in series to the first light sources in accordance with one or more current ratios specified in association with the first light sources so that an on-period of each of the first switching elements does not overrun, and
        control one or more second switching elements, connected in series to the first light sources, so as to be in an off-states; and
    the controller being configured to
        control one or more first switching elements, connected in series to the second light sources, so as to be in an off-states, and
        provide linear regulator control of one or more second switching elements, connected in series to the second light sources by operating in an active region in accordance with the current ratios specified in association with the second light sources.

4. The lighting device according to claim 2, further comprising
    a current adjuster configured to adjust a value of a driving current flowing through the light sources, wherein:
    the switching circuit includes a plurality of first switching elements respectively corresponding to the light sources and to be electrically connected to the light sources in series;
    the current adjuster is electrically connected in series to each of the first switching elements;
    the variable control circuit includes a plurality of second switching elements that respectively correspond to a plurality of series load circuits,
    each of the second switching elements has a first end and a second end,
        the first end is electrically connected to a connection point between a corresponding light source of the light sources and a corresponding first switching element of the first switching elements, and
        the second end is electrically connected to a negative electrode of the power supply circuit;
    the controller is configured to control the current adjuster, the first switching elements, and the second switching elements;

the controller is configured to control the current adjuster based on the dimming signal, the controller being configured to specify a plurality of current ratios in association with the light sources by using a plurality of individual currents respectively flowing through the light sources and a total current which is a sum of the individual currents, each of the current ratios being a ratio of a corresponding individual current over the total current based on the color signal;

one or more first light sources of the light sources have a current ratio bigger than a predetermined threshold, and one or more second light sources of the light sources have a current ratio equal to or smaller than the predetermined threshold; and the controller is configured to
  individually control switching on and off of one or more first switching elements, connected in series to the first light sources in accordance with one or more current ratios specified in association with the first light sources so that an on-period of each of the first switching elements does not overrun, and
  control one or more second switching elements, connected in series to the first light sources, so as to be in an off-states; and the controller being configured to
  control one or more first switching elements, connected in series to the second light sources, so as to be in an off-states, and
  provide linear regulator control of one or more second switching elements, connected in series to the second light sources by operating in an active region in accordance with the current ratios specified in association with the second light sources.

5. The lighting device according to claim 3, wherein:
the first light sources includes a third light source having a minimum value of an individual current, and a fourth light source having a different individual current from the third light source;
an on-period of the third light source is a unit time; and
an on-period of the fourth light source is set as an integral multiple of the unit time in accordance with an output ratio of a current ratio of the third light source and a current ratio of the fourth light source.

6. The lighting device according to claim 4, wherein:
the first light sources includes a third light source having a minimum value of an individual current, and a fourth light source having a different individual current from the third light source;
an on-period of the third light source is a unit time; and
an on-period of the fourth light source is set as an integral multiple of the unit time in accordance with an output ratio of a current ratio of the third light source and a current ratio of the fourth light source.

7. The lighting device according to claim 3, wherein:
the current adjuster includes a third switching element; and
the controller controls on and off of the third switching element.

8. The lighting device according to claim 4, wherein:
the current adjuster includes a third switching element; and
the controller controls on and off of the third switching element.

9. The lighting device according to claim 5, wherein:
the current adjuster includes a third switching element; and
the controller controls on and off of the third switching element.

10. The lighting device according to claim 6, wherein:
the current adjuster includes a third switching element; and
the controller controls on and off of the third switching element.

11. A lighting apparatus, comprising:
the lighting device according to claim 1; and
the of light sources.

12. A lighting apparatus, comprising:
the lighting device according to claim 2; and
the light sources.

13. A lighting apparatus, comprising:
the lighting device according to claim 3; and
the light sources.

14. A lighting apparatus, comprising:
the lighting device according to claim 4; and
the light sources.

15. A lighting apparatus, comprising:
the lighting device according to claim 9; and
the plurality of light sources.

16. A lighting apparatus, comprising:
the lighting device according to claim 10; and
the light sources.

17. A lighting fixture, comprising:
the lighting apparatus according to claim 11; and
a fixture body holding at least the light sources.

18. A lighting fixture, comprising:
the lighting apparatus according to claim 12; and
a fixture body holding at least the light sources.

19. A lighting fixture, comprising:
the lighting apparatus according to claim 15; and
a fixture body holding at least the light sources.

20. A lighting fixture, comprising:
the lighting apparatus according to claim 16; and
a fixture body holding at least the light sources.

* * * * *